United States Patent
Anderson

(10) Patent No.: US 6,796,275 B2
(45) Date of Patent: Sep. 28, 2004

(54) METHOD AND APPARATUS FOR CALCULATING MINIMUM VALVE LIFT FOR INTERNAL COMBUSTION ENGINES

(75) Inventor: Michael K. Anderson, Clarkston, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/268,455

(22) Filed: Oct. 10, 2002

(65) Prior Publication Data

US 2004/0069257 A1 Apr. 15, 2004

(51) Int. Cl.⁷ .................................................. F01L 1/34
(52) U.S. Cl. .............................. 123/90.15; 123/90.16
(58) Field of Search ...................... 123/90.11, 90.15, 123/90.16, 90.17, 316; 701/103, 115

(56) References Cited

U.S. PATENT DOCUMENTS 5,495,830 A * 3/1996 Wu ........................ 123/90.15

* cited by examiner

Primary Examiner—Thomas Denion
Assistant Examiner—Zelalem Eshete
(74) Attorney, Agent, or Firm—Christopher DeVries

(57) ABSTRACT

A controller calculates valve lift of intake and exhaust valves for a cylinder of an internal combustion engine. A first desired pressure ratio ($P_{cyl}/P_{int}$) is selected to minimize induction pumping losses. Maximum cylinder demand is calculated. Intake valve lift is calculated by matching an effective flow capacity through at least one intake valve of the engine to the maximum cylinder demand. The intake valve is actuated based on the calculated intake valve lift. A second desired pressure ratio ($P_{exh}/P_{cyl}$) for minimizing exhaust pumping losses is selected. Maximum cylinder demand is calculated. Exhaust valve lift is calculated by matching an effective flow capacity through at least one exhaust valve of the engine to the maximum cylinder demand. The exhaust valve is actuated based on the calculated exhaust valve lift.

20 Claims, 5 Drawing Sheets

METHOD AND APPARATUS FOR CALCULATING MINIMUM VALVE LIFT FOR INTERNAL COMBUSTION ENGINES

FIELD OF THE INVENTION

The present invention relates to internal combustion engines, and more particularly to a control system for calculating minimum valve lift for an internal combustion engine.

BACKGROUND OF THE INVENTION

Intake valves control the air/fuel mixture into cylinders of an internal combustion engine. Exhaust valves control gases exiting the cylinders of an internal combustion engine. Cams lobes on a camshaft push against the valves to open the valves as the camshaft rotates. Springs on the valves return the valves to a closed position. The timing, duration and degree of the opening or "valve lift" of the valves impacts the performance of the engine.

As the camshaft spins, the cam lobes open and close the intake and exhaust valves in time with the motion of the piston. There is a direct relationship between the shape of the cam lobes and the way that the engine performs at different speeds. When running at low speeds, the cam lobes should ideally be shaped to open as the piston starts moving downward in the intake stroke. The intake valve closes as the piston bottoms out and then, following compression combustion and expansion strokes, the exhaust valve opens. The exhaust valve closes as the piston completes the exhaust stroke.

At higher RPMs, however, this configuration for the camshaft lobes does not work as well. If the engine is running at 4,000 RPM, the valves are opening and closing 33 times every second. At this speed, the piston is moving very quickly. The air/fuel mixture rushing into the cylinder is also moving very quickly. When the intake valve opens and the piston starts the intake stroke, the air/fuel mixture in the intake runner starts to accelerate into the cylinder. By the time that the piston reaches the bottom of its intake stroke, the air/fuel is moving at a high speed. If the intake valve is shut quickly, all of the air/fuel stops and does not enter the cylinder. By leaving the intake valve open a little longer, the momentum of the fast-moving air/fuel continues to force air/fuel into the cylinder as the piston starts its compression stroke. The faster the engine goes, the faster the air/fuel moves and the longer the intake valve should stay open. The valve should also be opened wider at higher speeds. This parameter, called valve lift, is governed by the cam lobe profile.

VTEC (Variable Valve Timing and Lift Electronic Control) by Honda is an electronic and mechanical system that allows the engine to have multiple camshafts. VTEC engines have an extra intake cam lobe with a rocker that follows the extra intake cam profile. The profile on the extra intake cam keeps the intake valve open longer than the other cam profile. At low engine speeds, the valves move in accordance with the standard cam profile and the extra rocker is not connected to any valves. At high engine speeds, a pin locks the extra rocker to the two standard rockers that activate the two intake valves.

Other engines phase the valve timing. This does not change the valve duration; instead, the entire valve event is advanced or retarded. This is done by rotating the camshaft ahead a few degrees. If the intake valves normally open at 10 degrees before top dead center (TDC) and close at 190 degrees after TDC, the total duration is 200 degrees. The opening and closing times are shifted using a mechanism that rotates the cam. For example, the valve might open at 10 degrees after TDC and close at 210 degrees after TDC. Closing the valve 20 degrees later improves performance. However, it would be better to increase the duration that the intake valve is open.

The camshafts on some Ferrari engines are cut with a three-dimensional profile that varies along the length of the cam lobe. At one end of the cam lobe is the least aggressive cam profile, and at the other end is the most aggressive. The shape of the cam smoothly blends these two profiles together. A mechanism can slide the whole camshaft laterally so that the valve engages different parts of the cam. The shaft spins just like a regular camshaft, but by gradually sliding the camshaft laterally as the engine speed and load increases, the valve timing can be optimized.

Several engine manufacturers are experimenting with systems that would allow infinitely variable valve timing lift and duration. For example, each valve has an actuator. A computer controls the opening and closing of the intake and exhaust valves. These engines do not need a camshaft. With this type of engine control system, the maximum engine performance minimum emission output, maximum efficiency or some balanced combination of all three can theoretically be provided at every engine speed and load. The computer controller, however, must have an algorithm for valve lift that balances the energy consumption of the valve actuation system with the optimum thermo-dynamics of the engine. The calculations must also be computationally feasible by an engine controller at the anticipated calculation rates.

SUMMARY OF THE INVENTION

A method and apparatus according to the invention commands valve lift of an intake valve for a cylinder of an internal combustion engine. A first desired pressure ratio ($P_{cyl}/P_{int}$) is selected for minimum induction pumping losses. A maximum cylinder flow demand is calculated. Intake valve lift is calculated by matching the effective flow capacity through intake valves of the engine to the maximum cylinder demand. The intake valve is actuated based on the calculated valve lift.

In another aspect of the invention, method and apparatus according to the invention commands valve lift of an exhaust valve for a cylinder of an internal combustion engine. A second desired pressure ratio ($P_{exh}/P_{cyl}$) for minimum exhaust pumping losses is selected. A maximum cylinder demand is calculated. Exhaust valve lift is calculated by matching an effective flow capacity through the exhaust valves of the engine to the maximum cylinder demand. The exhaust valve is actuated based on the calculated exhaust valve lift.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The energy consumption of variable lift valve actuation technologies increase with valve lift. The present invention minimizes valve lift without sacrificing the benefits of flexible valve lift control. Minimum valve lift calculations are generated using a model-based engine control system for an engine equipped with a variable lift valve actuators.

Figure 1:
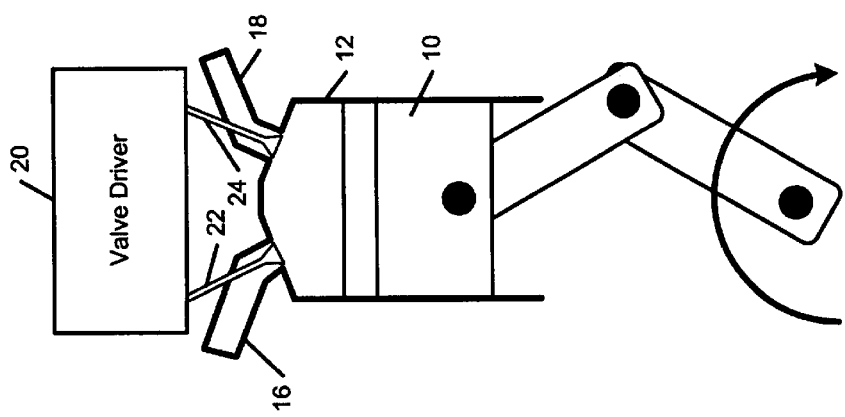
FIG. 1 illustrates a cylinder with intake and exhaust valves.

Referring now to FIG. 1, a piston 10 and a cylinder 12 of an internal combustion engine are shown. The cylinder 12 includes intake and exhaust manifolds 16 and 18. One or more valve drivers 20 adjust the valve lift of intake and exhaust valves 22 and 24. For example, the valve driver 20 can include a solenoid, a motor, or any other device that can accurately adjust the valve lift of the valves 22 and 24. As can be appreciated, additional intake and exhaust valves may be provided.

Figure 2:
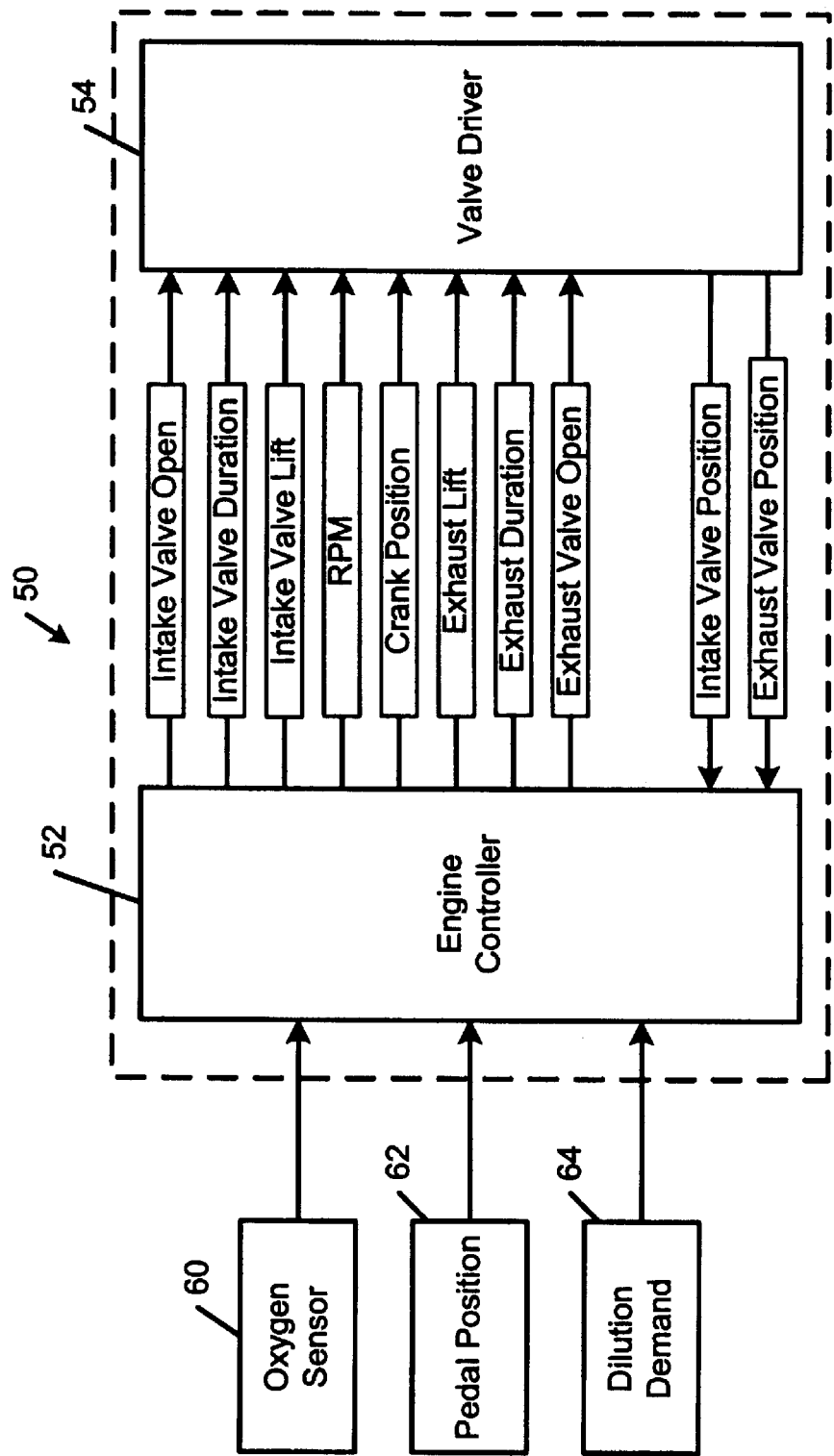
FIG. 2 is a functional block diagram of a control system for calculating intake and exhaust valve lift for an internal combustion engine.

Referring now to FIG. 2, an engine control system 50 for calculating minimum valve lift for the internal combustion engine is shown. The engine control system includes an engine controller 52 and a valve driver 54. The engine controller 52 is connected to an oxygen sensor 60 that senses oxygen content in the exhaust gas. The ECM 52 is also connected to a pedal position sensor 62 that generates a pedal position signal based upon accelerator pedal position. A dilution demand signal is generated by the engine controller 52 based on calibration. The engine controller 52 and the valve driver 54 may be integrated if desired.

The engine controller 52 outputs intake valve signals such as intake valve opening, intake valve duration, and intake valve lift to the valve driver 54. The engine controller 52 also generates RPM and crank position signals to the valve driver 54. The engine controller 52 outputs exhaust signals such as exhaust lift, exhaust duration and exhaust valve open signals to the valve driver 54. The valve driver 54 outputs intake valve position and exhaust valve position signals to the engine controller 52.

Figure 3A:
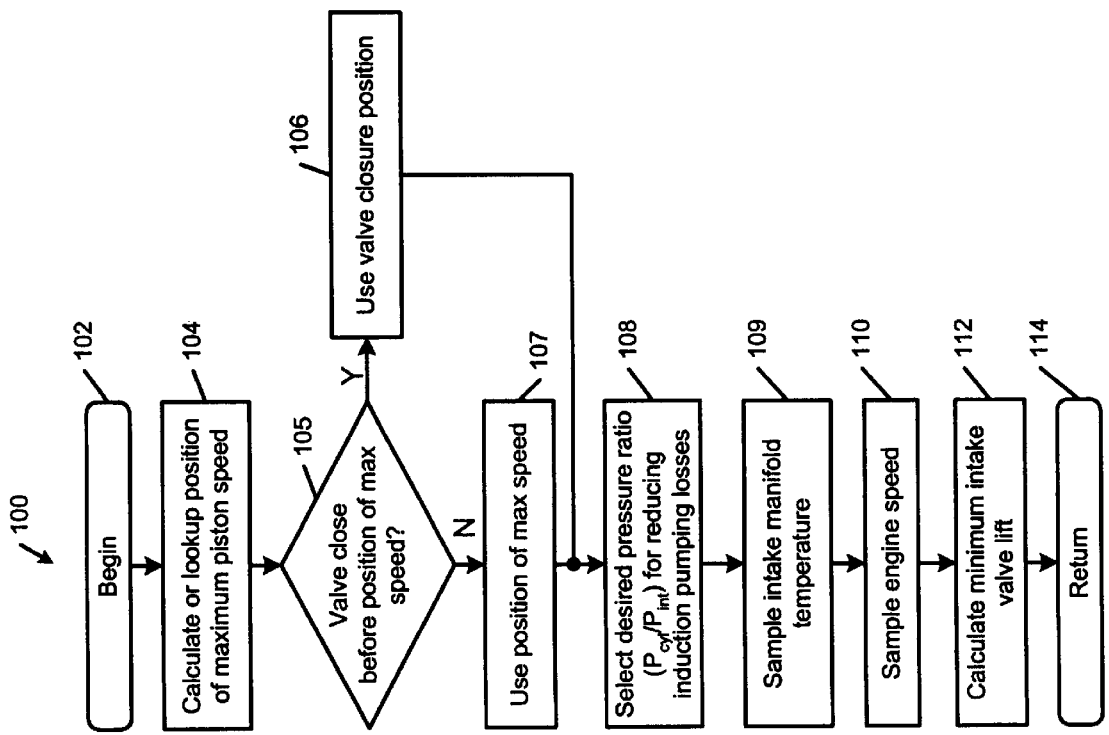
FIGS. 3A and 3B are flowcharts illustrating steps for calculating minimum intake and exhaust valve lift.

Referring now to FIG. 3A, steps for calculating minimum intake valve lift are shown generally at 100. Control begins in step 102. In step 104, the crank position with maximum piston speed is calculated or looked up. The step 104 is a one time calculation that is based on fixed engine geometry and is typically ≈72° after top dead center (ATDC) for most engines. This value is not calculated in real time.

If the valve closes before the position of maximum speed as determined in step 105, the valve closure position is used in step 106. Otherwise, the position of maximum speed is used in step 107. In step 108, the desired pressure ratio ($P_{cyl}/P_{int}$) for reduced induction pumping losses is selected. The desired pressure ratio ($P_{cyl}/P_{int}$) can come from a table that is based on calibration and will probably be relatively constant. For intake, the desired pressure ratio ($P_{cyl}/P_{int}$) will be approximately 0.90. For exhaust, the desired pressure ratio ($P_{exh}/P_{cyl}$) will be approximately 0.95.

In step 109, the intake manifold temperature is sampled. In step 112, the minimum intake valve lift is calculated. In step 114, control ends. Steps 109 to 112 are repeated for future calculations. Optionally, the intake manifold temperature is estimated.

Figure 3B:
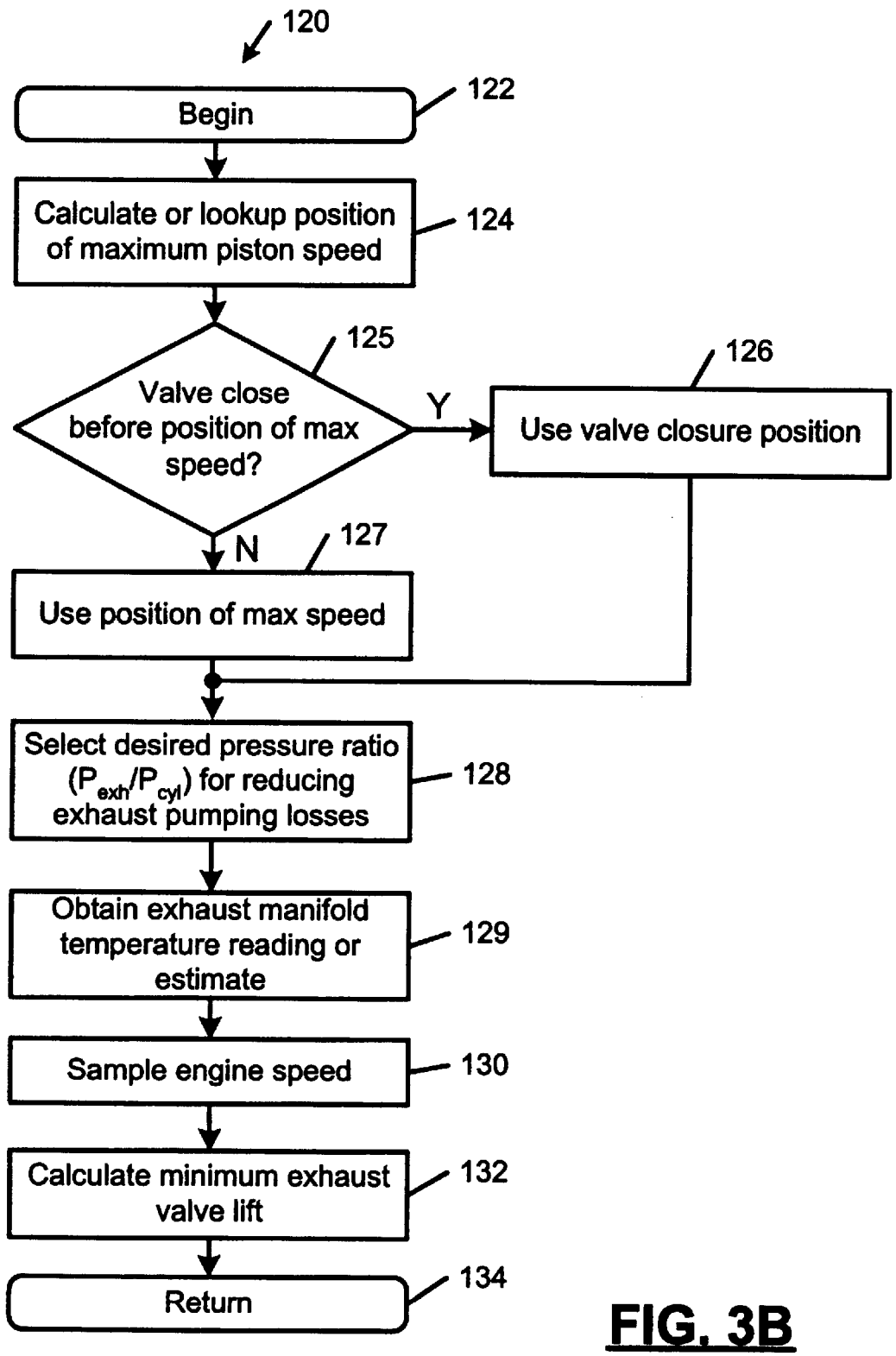

Referring now to FIG. 3B, steps for calculating minimum exhaust valve lift are shown generally at 120. Control begins in step 122. In step 124, the crank position with maximum piston speed is calculated or looked up. The step 124 is a one time calculation that is based on fixed engine geometry and is typically ≈72° after top dead center (ATDC) for most engines. This value is not calculated in real time.

If the valve closes before the position of maximum speed as determined in step 125, the valve closure position is used in step 126. Otherwise, the position of maximum speed is used in step 127. In step 128, the desired pressure ratio for reduced exhaust pumping losses is selected. In step 129, the exhaust manifold temperature is sampled. The exhaust manifold temperature can be an estimate or a sensor signal, which may be obtained from a dedicated sensor, from a table, a model or from an adjacent model of another system. In step 132, the minimum lift is calculated. In step 134, control ends. Steps 129 to 132 are repeated for future calculations. Optionally, the exhaust manifold temperature is estimated.

Because the energy consumption of valve actuation increases with valve lift, it is desirable to minimize valve lift without sacrificing the benefit provided by flexible valve control. The minimum lift required to significantly reduce engine pumping losses can be found by matching the mass flow capacity through the engine valves to the demand of the swept cylinder volume. The cylinder mass flow demand is the product of bulk gas density, piston speed and piston area, $$\dot{m}_{cyl} = \rho_{cyl}\frac{dV}{dt} = \rho_{cyl}A_p S_p = \frac{\pi P_{cyl} B^2 S_p}{4 R_{cyl} T_{cyl}} \quad (1)$$

where instantaneous piston speed is given by, $$S_p = \frac{\pi SN}{60}\sin(\theta)\left[1 + \frac{\cos(\theta)}{\sqrt{\left(\frac{2l}{S}\right)^2 - \sin^2(\theta)}}\right] \quad (2)$$

The mass flow rate into the cylinder through the effective intake valve flow area is given by $$\dot{m}_{v,int} = \frac{P_{int} A_{eff,int}}{\sqrt{R_{int} T_{int}}}\psi_{int} \quad (3a)$$

where $$\psi_{int} = \left(\frac{P_{cyl}}{P_{int}}\right)^{\frac{1}{\gamma}}\sqrt{\frac{2\gamma}{\gamma-1}\left[1 - \left(\frac{P_{cyl}}{P_{int}}\right)^{\frac{\gamma-1}{\gamma}}\right]} \quad \text{if} \quad (4a)$$

$$\frac{P_{cyl}}{P_{int}} > \left(\frac{2}{\gamma+1}\right)^{\frac{\gamma}{\gamma-1}}$$

such that the flow is not choked. The effective flow area is the product of the discharge coefficient and valve curtain area, $$A_{eff,int} = \pi C_{D,int} D_{v,int} n_{v,int} L_{int} \quad (5a)$$

Pumping loss is minimized when the effective flow area provides a mass flow rate that meets the maximum cylinder demand at a pressure ratio close to unity. The maximum demand occurs when the piston speed is a maximum. The crank position at which the piston speed is a maximum, $\theta_{S_{p,max}}$, must be determined iteratively, but is constant for a given ratio of connecting rod length to stroke.

To find the maximum piston speed, set piston acceleration to zero, $$\left(\frac{dV}{dt}\right)_{max} \text{ occurs when } \frac{d^2V}{dt^2} = 0$$

Zero piston acceleration is given by, $$\sin^2(\theta_{S_{p,max}})\left[\frac{\frac{\cos^2(\theta_{S_{p,max}})}{\sqrt{\left(\frac{2l}{S}\right)^2 - \sin^2(\theta_{S_{p,max}})}} - \sqrt{\left(\frac{2l}{S}\right)^2 - \sin^2(\theta_{S_{p,max}})}}{\left(\frac{2l}{S}\right)^2 - \sin^2(\theta_{S_{p,max}})}\right] +$$

$$\cos(\theta_{S_{p,max}})\left[1 + \frac{\cos(\theta_{S_{p,max}})}{\sqrt{\left(\frac{2l}{S}\right)^2 - \sin^2(\theta_{S_{p,max}})}}\right] = 0$$

or an alternative simplified form $$\sin^2(\theta_{S_{p,max}})\left[\frac{1 - \left(\frac{2l}{S}\right)^2}{\left(\frac{2l}{S}\right)^2 - \sin^2\theta_{S_{p,max}}}\right] +$$

$$\cos(\theta_{S_{p,max}})\sqrt{\left(\frac{2l}{S}\right)^2 - \sin^2(\theta_{S_{p,max}})} + \cos^2(\theta_{S_{p,max}}) = 0$$

which must be solved iteratively for $\theta_{S_{p,max}}$.

If the engine valve closes prior to $\theta_{S_{p,max}}$, then the piston speed upon valve closure, $\theta_{VC}$, should be used. Equating the mass flow rate through the valve to the maximum cylinder demand and substituting equations (1), (2), (3a), and (5a), $$\frac{\pi C_{D,int} D_{v,int} n_{v,int} L_{int} P_{int} \psi_{int}}{\sqrt{R_{int} T_{int}}} = \quad (6)$$

$$\frac{\pi^2 P_{cyl} B^2 SN}{240 R_{cyl} T_{cyl}}\sin(\theta_{S_{p,max}})\left[1 + \frac{\cos(\theta_{S_{p,max}})}{\sqrt{\left(\frac{2l}{S}\right)^2 - \sin^2(\theta_{S_{p,max}})}}\right]$$

Solving equation (6) for intake valve lift, $$L_{int} = \frac{\pi P_{cyl} B^2 SN \sqrt{R_{int} T_{int}}}{240 R_{cyl} T_{cyl} P_{int} C_{D,int} D_{v,int} n_{v,int} \psi_{int}} \quad (7)$$

$$\sin(\theta_{S_{p,max}})\left[1 + \frac{\cos(\theta_{S_{p,max}})}{\sqrt{\left(\frac{2l}{S}\right)^2 - \sin^2(\theta_{S_{p,max}})}}\right]$$

Assuming that the cylinder bulk gas temperature is relatively constant during the high flow portion of the induction process, equation (7) indicates that engine speed is the only operating parameter that determines the minimum required intake valve lift.

Define a constant, $c_{int}$, as $$c_{int} = C_{D,int} L_{int} = \frac{\pi P_{cyl} B^2 SN \sqrt{R_{int} T_{int}}}{240 R_{cyl} T_{cyl} P_{int} D_{v,int} n_{v,int} \psi_{int}} \quad (8)$$

$$\sin(\theta_{S_{p,max}})\left[1 + \frac{\cos(\theta_{S_{p,max}})}{\sqrt{\left(\frac{2l}{S}\right)^2 - \sin^2(\theta_{S_{p,max}})}}\right]$$

If the curtain area discharge coefficient can be described by a piecewise linear function of lift, $C_{D,int} = b_{int} + a_{int} L_{int}$, equation (8) can be rewritten as, $$c_{int} = C_{D,int} L_{int} = (b_{int} + a_{int} L_{int}) L_{int} = b_{int} L_{int} + a_{int} L_{int}^2 \quad (9)$$

Solving equation (9) for lift using the quadratic formula, $$L_{int} = \frac{-b_{int} \pm \sqrt{b_{int}^2 + 4 a_{int} c_{int}}}{2 a_{int}} \quad (10)$$

For mass discharge from the cylinder during the exhaust process, equations (3a) and (4a) can be rewritten as, $$\dot{m}_{v,exh} = \frac{P_{cyl} A_{eff,exh}}{\sqrt{R_{cyl} T_{cyl}}} \psi_{exh} \quad (3b)$$

where $$\psi_{exh} = \left(\frac{P_{exh}}{P_{cyl}}\right)^{\frac{1}{\gamma}} \sqrt{\frac{2\gamma}{\gamma-1}\left[1-\left(\frac{P_{exh}}{P_{cyl}}\right)^{\frac{\gamma-1}{\gamma}}\right]} \text{ if} \quad (4b)$$

$$\frac{P_{exh}}{P_{cyl}} > \left(\frac{2}{\gamma+1}\right)^{\frac{\gamma}{\gamma-1}}$$

and equation (5a) can be written as, $$A_{eff,exh} = \pi C_{D,exh} D_{v,exh} n_{v,exh} L_{exh} \quad (5b)$$

Equating the mass flow rate through the exhaust valve to the maximum cylinder demand and substituting equations (1), (2), (3b), and (5b), $$\frac{\pi C_{D,exh} D_{v,exh} n_{v,exh} L_{exh} P_{cyl} \psi_{exh}}{\sqrt{R_{cyl} T_{cyl}}} = \quad (11)$$

$$\frac{\pi^2 P_{cyl} B^2 SN}{240 R_{cyl} T_{cyl}} \sin(\theta_{S_p,max}) \left[1 + \frac{\cos(\theta_{S_p,max})}{\sqrt{\left(\frac{2l}{S}\right)^2 - \sin^2(\theta_{S_p,max})}}\right]$$

Solving equation (11) for exhaust valve lift, $$L_{exh} = \frac{\pi B^2 SN}{240 C_{D,exh} D_{v,exh} n_{v,exh} \sqrt{R_{cyl} T_{cyl}} \psi_{exh}} \quad (12)$$

$$\sin(\theta_{S_p,max}) \left[1 + \frac{\cos(\theta_{S_p,max})}{\sqrt{\left(\frac{2l}{S}\right)^2 - \sin^2(\theta_{S_p,max})}}\right]$$

Equations (8) through (10) can be similarly applied to the exhaust valve to account for the dependence of discharge coefficient on valve lift.

For an engine with a connecting rod length of, l=146.5 mm, and a stroke of, S=94.6 mm, the position of maximum piston speed is $\theta_{S_p,max}$=73.59°=1.284 rad, such that $$\sin(\theta_{S_p,max}) \left[1 + \frac{\cos(\theta_{S_p,max})}{\sqrt{\left(\frac{2l}{S}\right)^2 - \sin^2(\theta_{S_p,max})}}\right] =$$

$$\sin(73.6)\left[1 + \frac{\cos(73.6)}{\sqrt{\left[\frac{2(146.5 \text{ mm})}{94.6 \text{ mm}}\right]^2 - \sin^2(73.6)}}\right] = 1.051$$

If a pressure ratio of $$\frac{P_{cyl}}{P_{int}} = 0.90$$

sufficiently reduces induction pumping loss, the sub-critical flow multiplier for air and fuel, γ=1.35, is given by, $$\psi_{int} = \left(\frac{P_{cyl}}{P_{int}}\right)^{\frac{1}{\gamma}} \sqrt{\frac{2\gamma}{\gamma-1}\left[1-\left(\frac{P_{cyl}}{P_{int}}\right)^{\frac{\gamma-1}{\gamma}}\right]} =$$

$$(0.90)^{\frac{1}{1.35}} \sqrt{\frac{2(1.35)}{1.35-1}\left[1-(.90)^{\frac{1.35-1}{1.35}}\right]} = 0.4217$$

Assume the engine has a bore of, B=86 mm, two intake valves per cylinder, $n_{v,int}$=2, each with a diameter of $D_{v,int}$=35.1 mm with an average low-lift discharge coefficient of $C_{D,int}$=0.63 and an intake manifold temperature of $T_{int}$=298.15K. If the cylinder bulk gas temperature is relatively constant at $T_{cyl}$=350K during the induction process, the minimum intake valve lift as a function of engine speed is, $$L_{int} = \frac{\pi(0.9)(86 \text{ mm})^2(94.6 \text{ mm})\sqrt{\left(0.276 \frac{\text{kN-m}}{\text{kg-K}}\right)(298.15 \text{ K})\left(\frac{1000 \text{ N}}{\text{kN}}\right)\left(\frac{\text{kg-m}}{\text{N-s}^2}\right)\left(\frac{1000 \text{ mm}}{\text{m}}\right)^2}(1.051)}{240\left(0.276 \frac{\text{kN-m}}{\text{kg-K}}\right)(350 \text{ K})\left(\frac{1000 \text{ N}}{\text{kN}}\right)\left(\frac{\text{kg-m}}{\text{N-s}^2}\right)\left(\frac{1000 \text{ mm}}{\text{m}}\right)^2(0.63)(35.1 \text{ mm})\left(2 \frac{\text{valves}}{\text{cylinder}}\right)(0.4217)} N = 0.001379 \text{ N}$$

At 1300 rpm, the minimum intake lift required to significantly reduce induction pumping loss is given by $$L_{int}=0.001379(1300 \text{ rpm})=1.79 \text{ mm}$$

If a pressure ratio of $$\frac{P_{exh}}{P_{cyl}} = 0.95$$

sufficiently reduces exhaust pumping loss, the sub-critical flow multiplier is given by $$\psi_{exh} = \left(\frac{P_{exh}}{P_{cyl}}\right)^{\frac{1}{\gamma}} \sqrt{\frac{2\gamma}{\gamma-1}\left[1-\left(\frac{P_{exh}}{P_{cyl}}\right)^{\frac{\gamma-1}{\gamma}}\right]}$$

$$= (0.95)^{\frac{1}{1.29}} \sqrt{\frac{2(1.29)}{1.29-1}\left[1-(.95)^{\frac{1.29-1}{1.29}}\right]} = 0.3069$$

Assume the engine has two exhaust valves per cylinder, $n_{v,exh}$=2, each with a diameter of $D_{v,exh}$=30.1 mm with an average low-lift discharge coefficient of $C_{D,exh}$=0.703 and an average exhaust temperature of $T_{cyl}=1000$ K. The minimum exhaust valve lift as a function of engine speed is $$L_{exh} = \frac{\pi(86 \text{ mm})^2(94.6 \text{ mm})(1.051)}{240(0.703)(30.1 \text{ mm})\left(2 \frac{\text{valves}}{\text{cylinder}}\right)\sqrt{\left(0.292 \frac{\text{kN-m}}{\text{kg-K}}\right)(1000 \text{ K})\left(\frac{1000 \text{ N}}{\text{kN}}\right)\left(\frac{\text{kg-m}}{\text{N-s}^2}\right)\left(\frac{1000 \text{ mm}}{\text{m}}\right)^2}(0.3069)} N = 0.001371 N$$

At 1300 rpm, the minimum lift required to significantly reduce exhaust pumping loss is given by, $$L=0.001371(1300 \text{ rpm})=1.78 \text{ mm}$$

Figure 4:
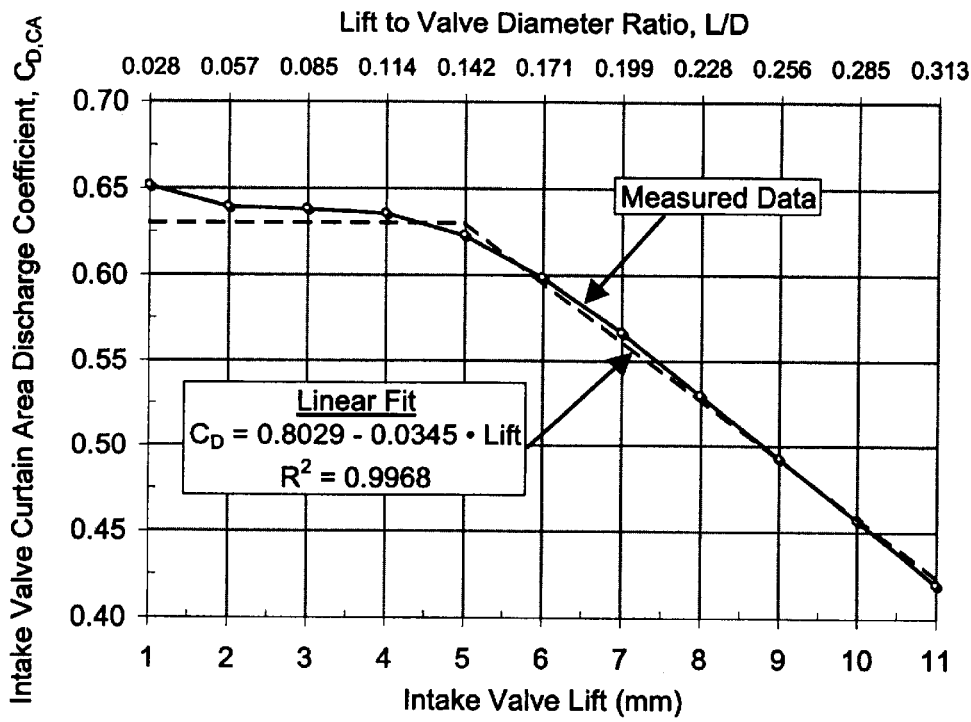
FIG. 4 is a graph showing intake valve curtain area discharge coefficient as a function of intake valve lift.

Referring now to FIG. 4, the measured CD as a function of lift characterizes the flow characteristics of the specific engine geometry. This relationship is one input to the algorithm of the present invention.

Figure 5:
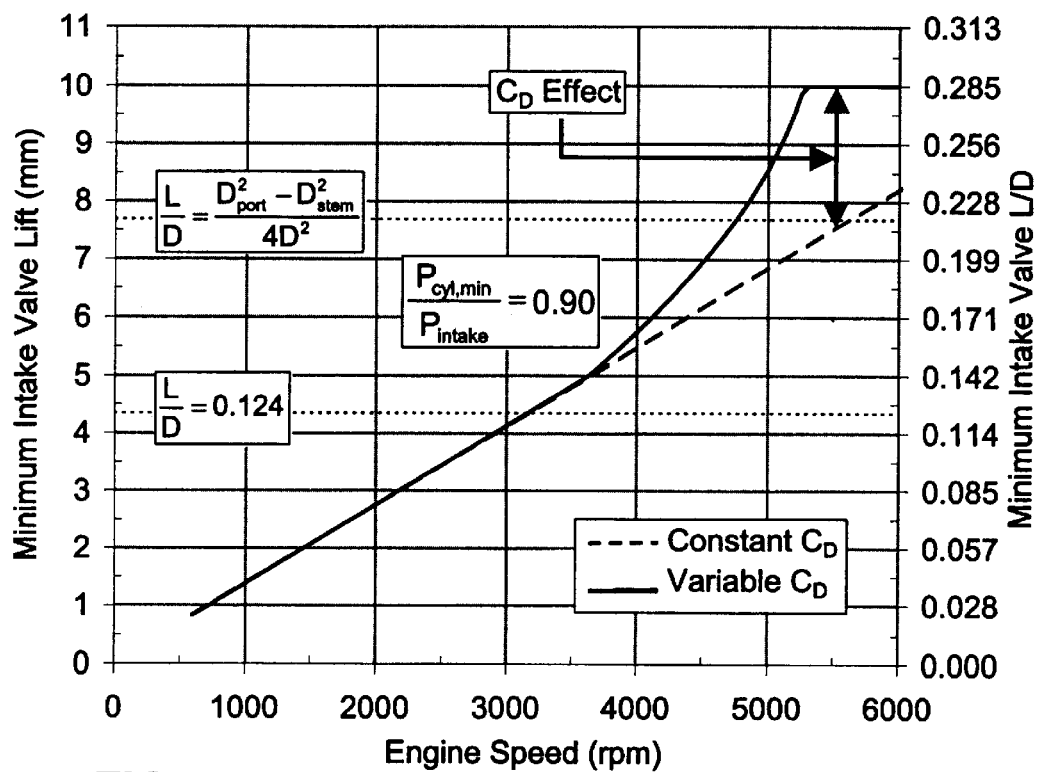
FIG. 5 is a graph showing minimum intake valve lift and minimum intake valve lift to diameter ratio as a function of engine speed.
Figure 6:
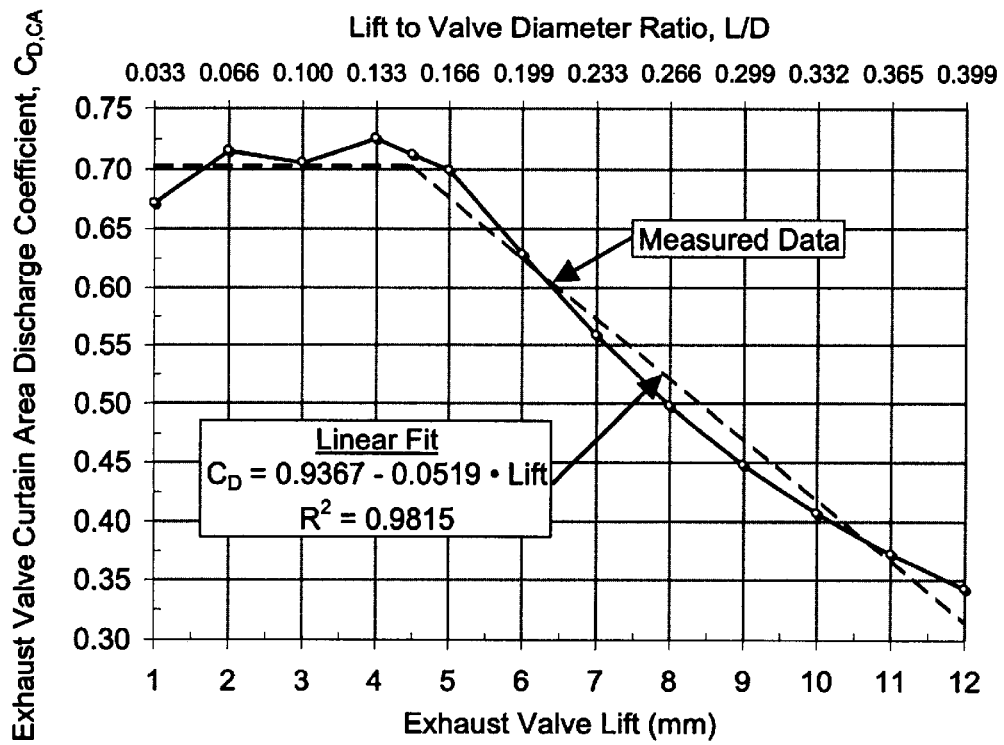
FIG. 6 is a graph showing exhaust valve curtain area discharge coefficient as a function of exhaust valve lift.
Figure 7:
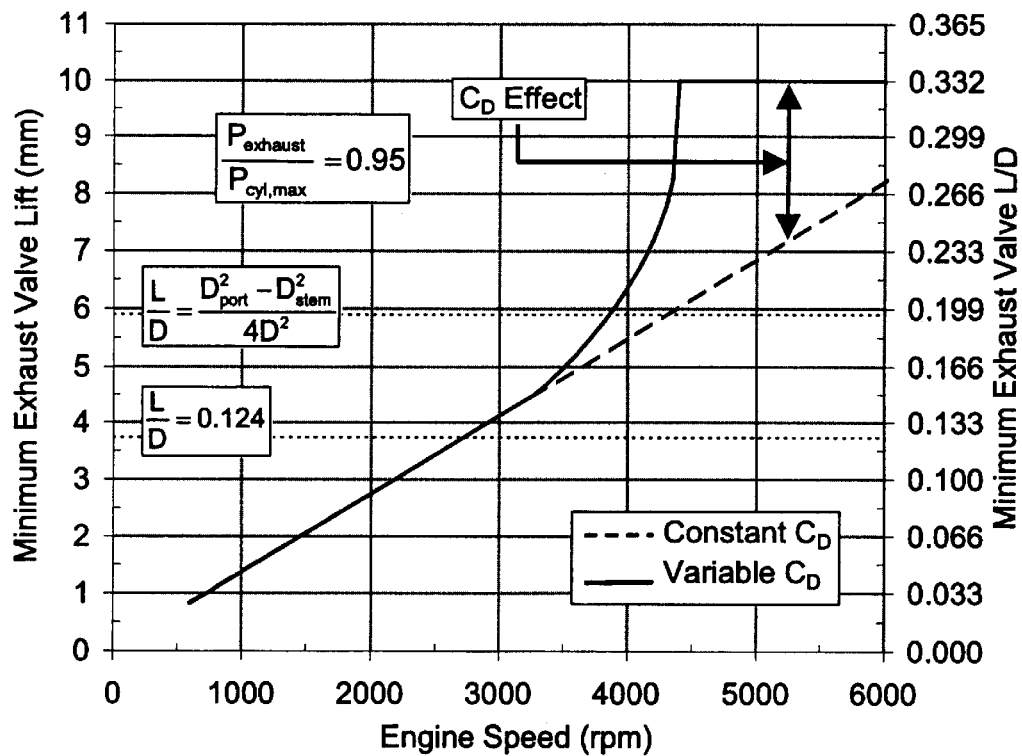
FIG. 7 is a graph showing minimum exhaust valve lift and exhaust valve lift to diameter ratio as a function of engine speed.

Referring now to FIG. 5, an output of the algorithm of the present invention is shown. Engine speed is the primary operating parameter upon which optimum valve lift depends. The effects of the relationship shown in FIGS. 4 and 6 do not become significant until moderate engine speeds such as approximately 3500 rpm. Otherwise, optimum lift is simply linear with speed. As a result, if N<the moderate speed, optimum lift is approximately equal to C*N where C is a constant. If N> the moderate speed, optimum lift is approximately equal to $C*N^2$.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method for controlling valve lift of an intake valve for a cylinder of an internal combustion engine, comprising:
   selecting a first desired pressure ratio ($P_{cyl}/P_{int}$) for induction pumping losses;
   calculating maximum cylinder demand;
   calculating intake valve lift by matching an effective flow capacity through at least one intake valve of said engine to said maximum cylinder demand;
   actuating said intake valve based on said calculated intake valve lift; and
   wherein said first desired pressure ratio is greater than 0.85 and less than or equal to 1.0.

2. The method of claim 1 wherein said maximum cylinder demand occurs at a crank position where one of maximum piston speed occurs and valve closure occurs.

3. The method of claim 1 wherein said first desired pressure ratio is approximately equal to 0.9.

4. The method of claim 2 wherein said crank position at maximum piston speed is calculated by solving the following equation iteratively:

$$\sin^2(\theta_{S_{p,max}})\left[\frac{\cos^2(\theta_{S_{p,max}})}{\sqrt{\left(\frac{2l}{S}\right)^2-\sin^2(\theta_{S_{p,max}})}} - \frac{\sqrt{\left(\frac{2l}{S}\right)^2-\sin^2(\theta_{S_{p,max}})}}{\left(\frac{2l}{S}\right)^2-\sin^2(\theta_{S_{p,max}})}\right] +$$

$$\cos(\theta_{S_{p,max}})\left[1 + \frac{\cos(\theta_{S_{p,max}})}{\sqrt{\left(\frac{2l}{S}\right)^2-\sin^2(\theta_{S_{p,max}})}}\right] = 0$$

wherein S is stroke length, l is connecting rod length, and $\theta_{S_{p,max}}$ is said crank position at maximum piston speed.

5. The method of claim 1 wherein said calculated intake valve lift is calculated by solving:

$$L_{int} = \frac{\pi P_{cyl} B^2 S N \sqrt{R_{int} T_{int}}}{240 R_{cyl} T_{cyl} P_{int} C_{D,int} D_{v,int} n_{v,int} \psi_{int}}$$

$$\sin(\theta_{S_{p,max}})\left[1 + \frac{\cos(\theta_{S_{p,max}})}{\sqrt{\left(\frac{2l}{S}\right)^2-\sin^2(\theta_{S_{p,max}})}}\right]$$

wherein B is bore diameter, S is stroke length, N is engine speed, $C_{D,int}$ is an intake discharge coefficient, $T_{cyl}$ is cylinder bulk gas temperature, S is stroke, l is connecting rod length, $D_{v,int}$ is intake valve diameter, $R_{cyl}$ is a universal gas constant for intake gas, $n_{v,int}$ is a number of intake valves per cylinder, $\theta_{S_{p,max}}$ is said crank position at maximum piston speed, an in $\Psi_{int}$ is:

$$\psi_{int} = \left(\frac{P_{cyl}}{P_{int}}\right)^{\frac{1}{\gamma}} \sqrt{\frac{2\gamma}{\gamma-1}\left[1-\left(\frac{P_{cyl}}{P_{int}}\right)^{\frac{\gamma-1}{\gamma}}\right]}$$

wherein γ is a subcritical flow multiplier.

6. A method for controlling valve lift of an exhaust valve for a cylinder of an internal combustion engine, comprising:
   selecting a second desired pressure ratio ($P_{exh}/P_{cyl}$) for exhaust pumping losses;
   calculating maximum cylinder demand;
   calculating exhaust valve lift by matching an effective flow capacity through at least one exhaust valve of said engine to said maximum cylinder demand;
   actuating said exhaust valve based on said calculated exhaust valve lift; and
   wherein said first desired pressure ratio is greater than 0.9 and less than or equal to 1.0.

7. The method of claim 6 wherein said maximum cylinder demand occurs at a crank position where one of maximum piston speed occurs and valve closure occurs.

8. The method of claim 6 wherein said first desired pressure ratio is approximately equal to 0.95.

9. The method of claim 7 wherein said crank position at maximum piston speed is calculated by solving the following equation iteratively:

$$\sin^2(\theta_{S_{p,\max}})\left[\frac{\frac{\cos^2(\theta_{S_{p,\max}})}{\sqrt{\left(\frac{2l}{S}\right)^2 - \sin^2(\theta_{S_{p,\max}})}} - \sqrt{\left(\frac{2l}{S}\right)^2 - \sin^2(\theta_{S_{p,\max}})}}{\left(\frac{2l}{S}\right)^2 - \sin^2(\theta_{S_{p,\max}})}\right] +$$

$$\cos(\theta_{S_{p,\max}})\left[1 + \frac{\cos(\theta_{S_{p,\max}})}{\sqrt{\left(\frac{2l}{S}\right)^2 - \sin^2(\theta_{S_{p,\max}})}}\right] = 0$$

where S is stroke length, L is connecting rod length, and $\theta_{Sp,max}$ is said crank position at maximum piston speed.

10. The method of claim 6 wherein said calculated valve lift is calculated by solving:

$$L_{exh} = \frac{\pi B^2 SN}{240 C_{D,exh} D_{v,exh} n_{v,exh} \sqrt{R_{cyl} T_{cyl}} \, \psi_{exh}}$$

$$\sin(\theta_{S_{p,\max}})\left[1 + \frac{\cos(\theta_{S_{p,\max}})}{\sqrt{\left(\frac{2l}{S}\right)^2 - \sin^2(\theta_{S_{p,\max}})}}\right]$$

wherein B is bore diameter, S is stroke length, N is engine speed, $C_{D,\,exh}$ is a intake discharge coefficient, $T_{cyl}$ is cylinder bulk gas temperature, S is stroke, l is connecting rod length, $D_{v,\,exh}$ is exhaust valve diameter, $R_{cyl}$ is a universal gas constant for exhaust gas, $n_{v,\,exh}$ is a number of intake valves per cylinder, $\theta_{Sp,max}$ is said crank position at maximum piston speed, and $\Psi_{exh}$ is defined by:

$$\psi_{exh} = \left(\frac{P_{exh}}{P_{cyl}}\right)^{\frac{1}{\gamma}} \sqrt{\frac{2\gamma}{\gamma-1}\left[1 - \left(\frac{P_{exh}}{P_{cyl}}\right)^{\frac{\gamma-1}{\gamma}}\right]}$$

wherein γ is a subcritical flow multiplier.

11. An engine control system for controlling valve lift of an intake valve for a cylinder of an internal combustion engine, comprising:
a controller that stores a first desired pressure ratio ($P_{cyl}/P_{int}$) for induction pumping losses, that calculates maximum cylinder demand, and that calculates intake valve lift by matching an effective flow capacity through at least one intake valve of said engine to said maximum cylinder demand;
a valve actuator that adjusts said intake valve based on said calculated valve lift; and
wherein said first desired pressure ratio is greater than 0.85 and less than or equal to 1.0.

12. The engine control system of claim 11 wherein said maximum cylinder demand occurs at a crank position where one of maximum piston speed occurs and valve closure occurs.

13. The engine control system of claim 11 wherein said first desired pressure ratio is approximately equal to 0.9.

14. The engine control system of claim 12 wherein said crank position at maximum piston speed is calculated by solving the following equation iteratively:

$$\sin^2(\theta_{S_{p,\max}})\left[\frac{\frac{\cos^2(\theta_{S_{p,\max}})}{\sqrt{\left(\frac{2l}{S}\right)^2 - \sin^2(\theta_{S_{p,\max}})}} - \sqrt{\left(\frac{2l}{S}\right)^2 - \sin^2(\theta_{S_{p,\max}})}}{\left(\frac{2l}{S}\right)^2 - \sin^2(\theta_{S_{p,\max}})}\right] +$$

$$\cos(\theta_{S_{p,\max}})\left[1 + \frac{\cos(\theta_{S_{p,\max}})}{\sqrt{\left(\frac{2l}{S}\right)^2 - \sin^2(\theta_{S_{p,\max}})}}\right] = 0$$

wherein S is stroke length, l is connecting rod length, and $\theta_{Sp,max}$ is said crank position at maximum piston speed.

15. The engine control system of claim 11 wherein said calculated intake valve lift is calculated by solving:

$$L_{int} = \frac{\pi P_{cyl} B^2 SN \sqrt{R_{int} T_{int}}}{240 R_{cyl} T_{cyl} P_{int} C_{D,int} D_{v,int} n_{v,int} \psi_{int}}$$

$$\sin(\theta_{S_{p,\max}})\left[1 + \frac{\cos(\theta_{S_{p,\max}})}{\sqrt{\left(\frac{2l}{S}\right)^2 - \sin^2(\theta_{S_{p,\max}})}}\right]$$

wherein B is bore diameter, S is stroke length, N is engine speed, $C_{D,\,int}$ is a intake discharge coefficient, $T_{cyl}$ is cylinder bulk gas temperature, S is stroke, l is connecting rod length, $D_{v,\,int}$ is intake valve diameter, $R_{cyl}$ is a universal gas constant for intake gas, $n_{v,\,int}$ is a number of intake valves per cylinder, $\theta_{Sp,max}$ is said crank position at maximum piston speed, and $\Psi_{int}$ is:

$$\psi_{int} = \left(\frac{P_{cyl}}{P_{int}}\right)^{\frac{1}{\gamma}} \sqrt{\frac{2\gamma}{\gamma-1}\left[1 - \left(\frac{P_{cyl}}{P_{int}}\right)^{\frac{\gamma-1}{\gamma}}\right]}$$

wherein γ is a subcritical flow multiplier.

16. A engine control system for controlling valve lift of an exhaust valve for a cylinder of an internal combustion engine, comprising:
a controller that stores a second desired pressure ratio ($P_{exh}/P_{cyl}$) for exhaust pumping losses, that calculates maximum cylinder demand, and that calculates exhaust valve lift by matching an effective flow capacity through at least one exhaust valve of said engine to said maximum cylinder demand; and
an actuator that adjusts said exhaust valve based on said calculated exhaust valve lift; and
wherein said first desired pressure ratio is greater than 0.9 and less than or equal to 1.0.

17. The engine control system of claim 16 wherein said maximum cylinder demand occurs at a crank position where one of maximum piston speed occurs and valve closure occurs.

18. The engine control system of claim 16 wherein said first desired pressure ratio is approximately equal to 0.95.

19. The engine control system of claim 17 wherein said crank position at maximum piston speed is calculated by solving the following equation iteratively:

$$\sin^2(\theta_{S_{p,\max}})\left[\frac{\frac{\cos^2(\theta_{S_{p,\max}})}{\sqrt{\left(\frac{2l}{S}\right)^2 - \sin^2(\theta_{S_{p,\max}})}} - \sqrt{\left(\frac{2l}{S}\right)^2 - \sin^2(\theta_{S_{p,\max}})}}{\left(\frac{2l}{S}\right)^2 - \sin^2(\theta_{S_{p,\max}})}\right] +$$

$$\cos(\theta_{S_{p,\max}})\left[1 + \frac{\cos(\theta_{S_{p,\max}})}{\sqrt{\left(\frac{2l}{S}\right)^2 - \sin^2(\theta_{S_{p,\max}})}}\right] = 0$$

where S is stroke length, l is connecting rod length, and $\theta_{Sp,max}$ is said crank position at maximum piston speed.

20. The engine control system of claim 17 wherein said calculated valve lift is calculated by solving:

$$L_{exh} = \frac{\pi B^2 SN}{240 C_{D,exh} D_{v,exh} n_{v,exh} \sqrt{R_{cyl} T_{cyl}} \, \psi_{exh}}$$

-continued $$\sin(\theta_{S_{p,\max}})\left[1 + \frac{\cos(\theta_{S_{p,\max}})}{\sqrt{\left(\frac{2l}{S}\right)^2 - \sin^2(\theta_{S_{p,\max}})}}\right]$$

wherein B is bore diameter, S is stroke length, N is engine speed, $C_{D,\,exh}$ is a intake discharge coefficient, $T_{cyl}$ is cylinder bulk gas temperature, S is stroke, l is connecting rod length, $D_{v,\,exh}$ is exhaust valve diameter, $R_{cyl}$ is a universal gas constant for exhaust gas, $n_{v,\,exh}$ is a number of intake valves per cylinder, $\theta_{Sp,max}$ is said crank position at maximum piston speed, and $\Psi_{exh}$ is defined by:

$$\psi_{exh} = \left(\frac{P_{exh}}{P_{cyl}}\right)^{\frac{1}{\gamma}} \sqrt{\frac{2\gamma}{\gamma - 1}\left[1 - \left(\frac{P_{exh}}{P_{cyl}}\right)^{\frac{\gamma-1}{\gamma}}\right]}$$

wherein γ is a subcritical flow multiplier.

* * * * *